J. C. SCHAF, Jr., AND W. J. HOLLIDAY.
TEST STAND FOR TESTING GENERATORS.
APPLICATION FILED NOV. 20, 1920.
1,397,296.
Patented Nov. 15, 1921.
2 SHEETS—SHEET 1.
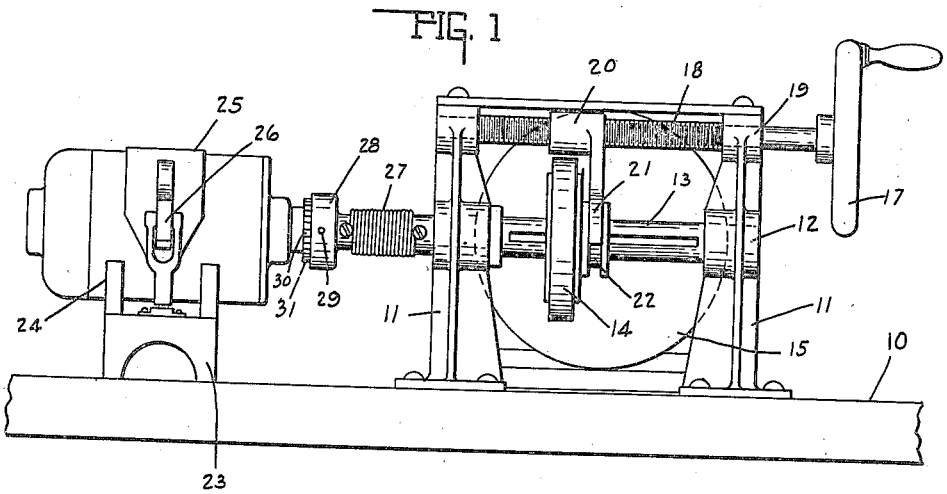
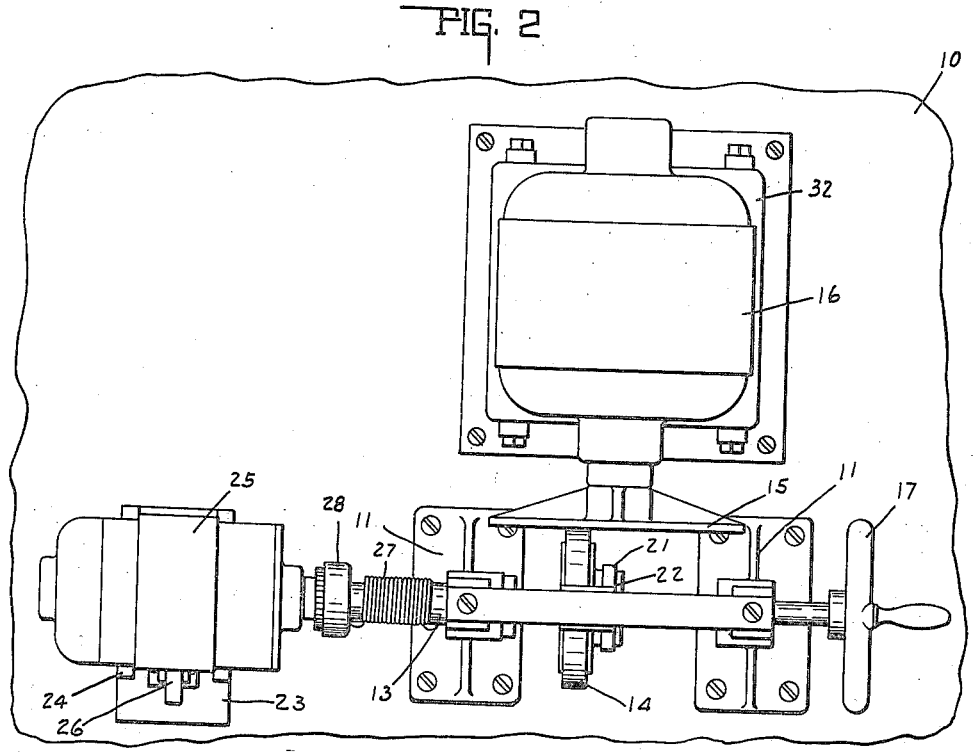
INVENTORS
JOSEPH C. SCHAF, JR.
WILLIAM J. HOLLIDAY.
BY
Lockwood & Lockwood
ATTORNEYS.

J. C. SCHAF, Jr., AND W. J. HOLLIDAY.
TEST STAND FOR TESTING GENERATORS.
APPLICATION FILED NOV. 20, 1920.
1,397,296.
Patented Nov. 15, 1921.
2 SHEETS—SHEET 2.
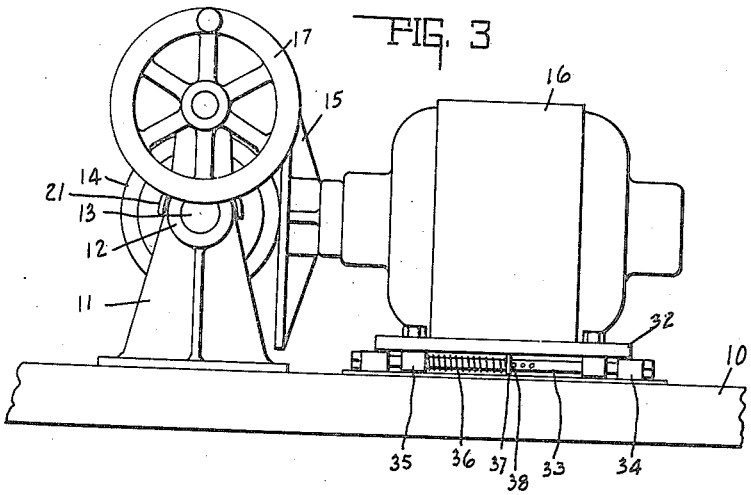
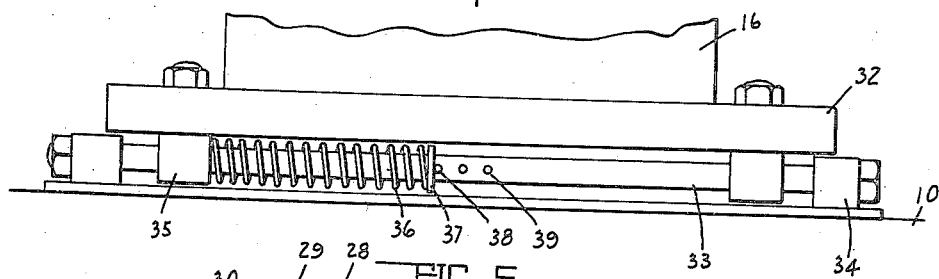
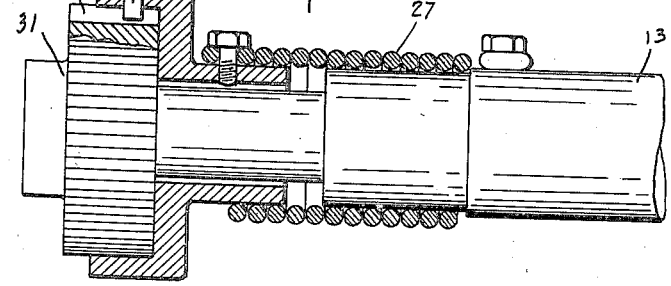
INVENTORS
JOSEPH C. SCHAF, Jr.
WILLIAM J. HOLLIDAY.
BY
ATTORNEYS

UNITED STATES PATENT OFFICE.

JOSEPH C. SCHAF, JR., AND WILLIAM J. HOLLIDAY, OF INDIANAPOLIS, INDIANA.

TEST-STAND FOR TESTING GENERATORS.

1,397,296.  Specification of Letters Patent.  Patented Nov. 15, 1921.

Application filed November 20, 1920. Serial No. 425,532.

*To all whom it may concern:*

Be it known that we, JOSEPH C. SCHAF, Jr., and WILLIAM J. HOLLIDAY, citizens of the United States, and residents of Indianapolis, county of Marion, and State of Indiana, have invented a certain new and useful Test-Stand for Testing Generators; and we do hereby declare that the following is a full, clear, and exact description thereof, reference being had to the accompanying drawings, in which like numerals refer to like parts.

This invention relates to a test stand for electric generators, and particularly generators of the type used for generating current in motor vehicles. The test stand is used for the purpose of testing the volts and ampere generated at a certain R. P. M., whereby the generator may be properly adjusted.

One feature of the invention consists in the construction of the test stand whereby the generator may be driven at variable speeds and be driven at a constant speed regardless of the load applied to the generator within certain limits, thus overcoming the defects experienced in adjusting the driven speed of the generator to a certain R. P. M. for testing purposes, and upon changing the load to the generator causing the R. P. M. to vary from the speed desired.

Another feature of the invention consists in the means for mounting the driving motor upon the test stand so as to enable it to be adjustably and yieldingly engaged with the generator driving mechanism for maintaining a constant R. P. M. with a friction drive and prevent any slippage.

The full nature of this invention will be understood from the accompanying drawings and the following description and claims.

Figure 1 is a side elevation of the driving mechanism of the test stand showing an electric generator in position to be driven. Fig. 2 is a plan view looking down on Fig. 1. Fig. 3 is an end elevation. Fig. 4 is an enlarged side elevation of the motor base and yielding adjustment. Fig. 5 is a cross sectional view of the yielding driving chuck.

In the drawings there is shown a machine for driving generators for testing purposes including a supporting table 10 upon which is mounted a frame consisting of the standards 11 provided with bearings 12 in which is mounted a driving shaft 13. Upon the shaft there is mounted a friction wheel 14 adapted to be driven by the frictional engagement with the friction disk 15 driven from the electric motor 16. The speed with which the shaft 13 is revolved by said motor is varied by turning the hand wheel 17 mounted on a screw shaft 18 supported in the bearings 19 of the standard 11 adapted to screw through the traveling member 20 so as to cause it to move backward and forward between the standards 11 upon the turning of a screw shaft 18. The traveling member 20 is provided with a yoke 21 which extends down and engages a flanged wheel 22 secured to the friction wheel 14 which is slidably keyed upon the shaft 13. By means of this construction, by turning the hand wheel 17 the friction wheel 14 is moved transversely of the friction disk 15, whereby it will be positioned in neutral and will not be driven when at the center of said disk but it will be driven at varying speeds between the center and periphery on one side thereof and at reverse varying speeds on the other side.

Mounted upon the table 10 there is a mounting block 23 so designed as to position and support the electric generator to be tested as to cause its shaft to be as nearly in alinement with the shaft 13 as possible. The generator 24 is secured in position by means of a flexible metal band 24 which is drawn about it and clamped tightly over the top thereof by the clamping member 26. The generator shaft is operatively connected with the driving shaft 13 through the yielding universal chuck comprising a spirally wound cylindrical spring 27 secured at one end to the shaft 13 and at the other end to the chuck member 28. The chuck member 28 is provided with an inwardly extending pin 29 in position to engage between the teeth 30 of the gear 31 mounted on the end of the generator and forming a part thereof. By means of this connection any torsional strain and adjustment in alinement is compensated for by the spring connection.

The motor 16 is mounted on the base 32 which is slidably mounted on the rods 33 which extend longitudinally of the motor on each side thereof and are fixedly supported upon the table 10 by the blocks 34. Slidably mounted upon the rods 33 there are sliding blocks 35 through which said rods extend, so that said motor is adapted to slide longitudinally of the table 10, whereby the friction disk 15 may be moved in and out of engagement with the friction wheel 14. In order to maintain a yielding pressure between said friction disk and friction wheel there is provided a spiral compression spring 36 mounted on each of the rods 13 between the forward block 35 and a collar 37. The collar 37 is held in position by the pin 38 adapted to be placed in the hole 39 extending diametrically through said rods, which will give the proper compression to the spring 36 and the proper degree of driving friction.

The invention claimed is:

1. A test stand for testing generators and the like including an electric motor having a friction disk, a driving shaft, a friction wheel slidably mounted on said driving shaft so as to engage said friction disk and be driven at variable speeds thereby, means for causing said friction wheel to slide upon said shaft so as to adjust said wheel and cause it to be driven at variable speeds, means for operatively connecting said driving shaft and the generator to be tested for driving it a given speed at which it is tested, and means for mounting said motor so as to maintain said friction disk in yielding frictional engagement with said friction wheel.

2. A test stand for testing generators and the like including an electric motor having a friction disk, a driving shaft, a friction wheel slidably mounted on said driving shaft so as to engage said friction disk and be driven at variable speeds thereby, means for causing said friction wheel to slide upon said shaft so as to adjust said wheel and cause it to be driven at variable speeds, means for operatively connecting said driving shaft and the generator to be tested for driving it a given speed at which it is tested, and compression springs adjustably positioned for yieldingly forcing said motor upon a sliding base whereby said friction disk will be yieldingly maintained against said friction wheel.

3. In combination with a driving motor and a driven shaft, of means for frictionally driving said shaft, including a friction disk mounted on said motor, a friction wheel keyed to said shaft in position to be engaged by said disk, a slidable base upon which said motor is mounted, and a compression spring mounted in said base for yieldingly forcing said motor and disk against said friction wheel under the desired pressure.

4. In combination with a driving motor and a driven shaft, of means for frictionally driving said shaft, including a friction disk mounted on said motor, a friction wheel keyed to said shaft in position to be engaged by said disk, a slidable base upon which said motor is mounted, and a compression spring mounted in said base for yieldingly forcing said motor and disk against said friction wheel, and means for adjusting the compression of said spring for regulating the frictional engagement of said disk and wheel.

5. In combination with a driving motor and a driven shaft, of means for frictionally driving said shaft, including a friction disk mounted on said motor, a friction wheel keyed to said shaft in position to be engaged by said disk, means for yieldingly maintaining said friction disk in engagement with said friction wheel, and a spring mounted in the base of said motor adapted to be adjusted therein for forcing said motor forward and causing said disk to frictionally engage said wheel under the desired yielding spring pressure.

6. In combination with a generator and a driving shaft therefor, of means for connecting the shaft of said generator with said driving shaft for causing said generator to be driven, including a spirally wound spring having one end secured to said shaft, a chuck member secured to the other end of said spring, and an inwardly and radially extending pin in said chuck member adapted to be inserted between the gear teeth on said shaft for removably connecting said chuck member and shaft, whereby said driving shaft will drive said generator shaft through said spring and chuck member without strain when not in alinement.

In witness whereof, we have hereunto affixed our signatures.

JOSEPH C. SCHAF, Jr.
WILLIAM J. HOLLIDAY.